United States Patent [19]

Basey

[11] 4,403,767

[45] Sep. 13, 1983

[54] VARIABLE RACK STAIR RAIL ASSEMBLY

[76] Inventor: Gene Basey, 18447 Santar, Rowland Heights, Calif. 91748

[21] Appl. No.: 220,453

[22] Filed: Dec. 29, 1980

[51] Int. Cl.³ .......................................... E04H 17/14
[52] U.S. Cl. .................................. 256/66; 256/59; 256/67; 403/292; 403/294; 403/361
[58] Field of Search ...................... 256/65, 66, 67, 59, 256/21, 22, 24, 73; 403/292, 294, 297, 298, 360, 361; 52/585, 573

[56] References Cited

U.S. PATENT DOCUMENTS

| | | | |
|---|---|---|---|
| 3,810,341 | 5/1974 | Holz | 403/292 X |
| 4,017,918 | 4/1977 | Harris | 256/21 X |
| 4,027,855 | 6/1977 | Lauzier | 256/59 X |
| 4,272,061 | 6/1981 | Suckno | 256/22 X |

*Primary Examiner*—Richard J. Scanlan, Jr.

*Attorney, Agent, or Firm*—Boniard I. Brown

[57] ABSTRACT

A variable rack stair rail assembly includes a hand rail and a shoe rail. A plurality of elongated balusters extends intermediate the shoe rail and the hand rail. Means are provided for joining each of the balusters to the hand rail and the shoe rail. The hand rail and shoe rail may be channel-shaped. The means for joining comprises an elongated first member and a generally sleeve shaped second member. The first and second members are dimensioned and configured for engagement. One of the members is disposed in cooperating relationship with one of the rails and the other of the members is disposed in cooperating relationship with one axial extremity of a baluster. Each baluster may be joined at each axial extremity in substantially the same manner. One axial extremity of each sleeve shaped member may have the contour of a section of a cone.

11 Claims, 12 Drawing Figures

VARIABLE RACK STAIR RAIL ASSEMBLY

BACKGROUND OF THE INVENTION

The invention relates to building construction and specifically to stair rail assemblies. The present application relates to apparatus which has the same function as the apparatus described in the applicant's earlier application Ser. No. 157,186, filed in the U.S. Patent and Trademark Office on June 6, 1980, U.S. Pat. No. 4,352,485. Still another apparatus is described in application Ser. No. 201,259 of the present applicant filed in the U.S. Patent and Trademark Office on Oct. 27, 1980, abandoned.

Stair rail assemblies typically include a hand rail and a shoe rail which are disposed in generally parallel relationship. A plurality of generally vertical balusters extend intermediate the hand rail and the shoe rail. A generally vertical post at the lower extremity of the assembly is referred to as a starting newel.

The prior art includes preassembled variable rack rail assemblies which use balusters that extend into channel shaped hand and shoe rails. In one form the prior art utilizes a plurality of pins which extend through the opposed sides of the channels of the hand rail and the shoe rail. Each pin engages an axial extremity of a baluster. Such constructions have not been wholly satisfactory because the manner of construction of such assemblies is of primary interest for factory assembly of the entire apparatus and subsequent fully assembled shipment. Shipment of fully assembled structures is inconvenient for the manufacturer, the building supply dealer and the contractor. Shipment to so called "Do-it-yourselfers" of such fully assembled apparatus may be impossible since such individuals will typically not have ready access to a truck or similar transport vehicle. Another disadvantage of such prior art structures is that the pins on which the balusters are pivoted are, at least in some cases, unsightly in appearance. It will thus be seen at least some of the prior art structures which do allow variation in the angle between the baluster and respectively the hand rail and shoe rail have several specific disadvantages in addition to being generally complex and expensive to manufacture.

The structures described in the applicant's copending applications overcome many of the problems inherent in the prior art structures which did not allow variation in the angle between each baluster and the hand and shoe rails and in addition avoids the complexity and expense which was inherent in the earlier structures which did allow such adjustment.

It is a primary object of the invention to provide apparatus which will allow flexibility in orientation of the balusters with respect to the shoe and hand rails and will at the same time allow shipment in a compact form.

It is another object of the invention to provide apparatus which will be able to withstand substantial loads without resultant damage as in some prior art apparatus.

It is another object of the invention to provide apparatus which may be even more easily assembled at the individual construction site than even the apparatus described in the co-pending applications of the present applicant.

Another object of the invention is to provide at least some embodiments that will snap into locking engagement with a rail with only a slight axial movement of the baluster.

Another object of the invention is to provide apparatus which will minimize total construction costs by reducing the total cost of installing a stair rail assembly including the cost for material and labor to install the apparatus, specifically the labor required in the steps of providing the proper orientation of the shoe rail and hand rail with respect to the steps of a stairway.

Still another object of the invention is to provide apparatus which makes it easy for the user to vary the angle between both the shoe and hand rail with respect to the baluster, that is, to rack the assembly.

Yet another object of the invention is to provide apparatus which is inexpensive to manufacture.

SUMMARY OF THE INVENTION

The foregoing objects and other objects and advantages which shall become apparent from the detailed description of the preferred embodiment are attained in a variable rack stair rail assembly which includes a channel shaped hand rail, a channel shaped shoe rail, and a plurality of elongated balusters extending intermediate the channel in the shoe rail and the channel in the hand rail. Means are provided for joining each of the balusters to the hand rail and the shoe rail. The means for joining may include first and second members dimensioned and configured for engagement. One of the members is disposed in cooperating relationship with one of the rails and the other of the members is disposed in cooperating relationship with one axial extremity of one of the balusters.

Each baluster may be joined at each axial extremity in substantially the same manner. The second member may have one axial extremity which has an opening communicating therewith and the one axial extremity is generally flange shaped. The one axial extremity has the contour of a section of a cone. The axial extremity has a varying axial extent measured along the radial extent thereof and the axial extent is greater proximate to the bore than proximate to the periphery thereof. Each of the first members has a plurality of axial steps therein. Each of the axial steps has at least a portion which is a section of a cone. Each axial step is tapered so that the smallest radial dimension thereof is nearer to the axial extremity of the first member which engages the second member.

In another embodiment the first member has at least an axial section for cooperation with the second member which is a generally cylindrically shaped section. The second member has an interior which is generally cylindrically shaped. The first member may further include a flange extending generally radially and the flange defines a first axial section thereof which cooperates with the second member and a second axial section thereof which cooperates with one of the balusters.

The first and second members may be manufactured of polyvinyl chloride. The first and second members are joined by a bonding material. The bonding material is a solvent for polyvinyl chloride.

BRIEF DESCRIPTION OF THE ACCOMPANYING DRAWING

DESCRIPTION OF THE PREFERRED EMBODIMENT

Figure 1:
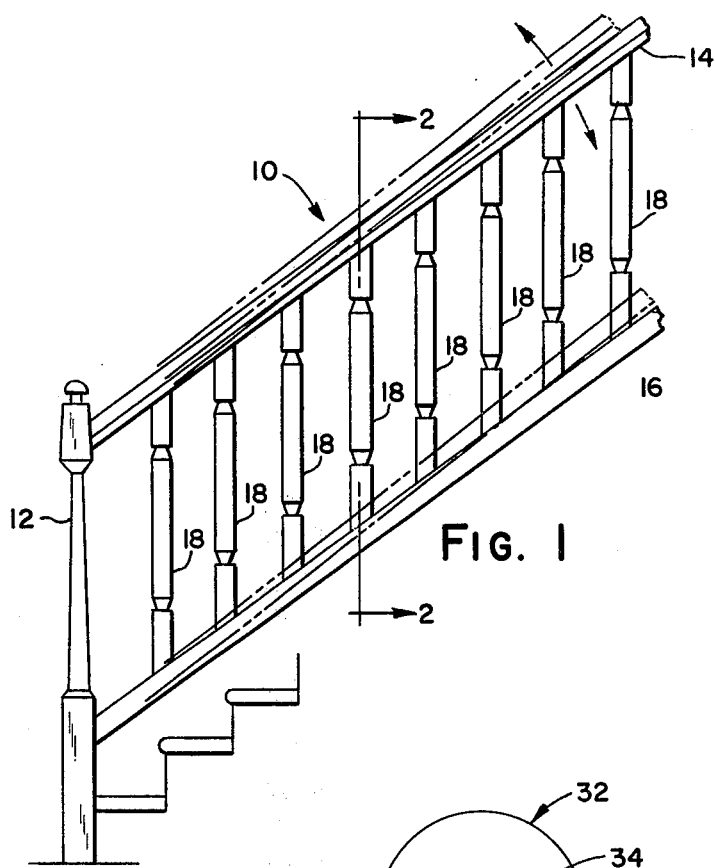
FIG. 1 is a side view of a stair rail assembly in accordance with a first embodiment of the invention.
Figure 2:
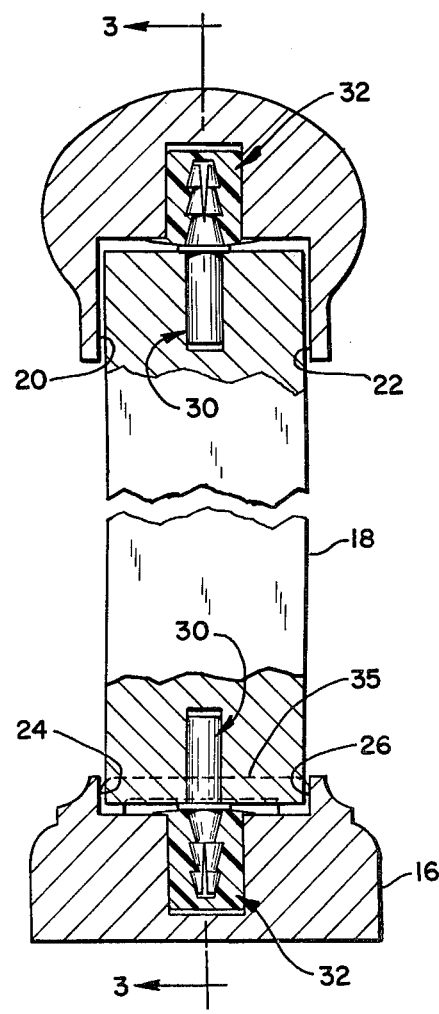
FIG. 2 is a broken away sectional view taken along the line 2—2 of FIG. 1.
Figure 3:
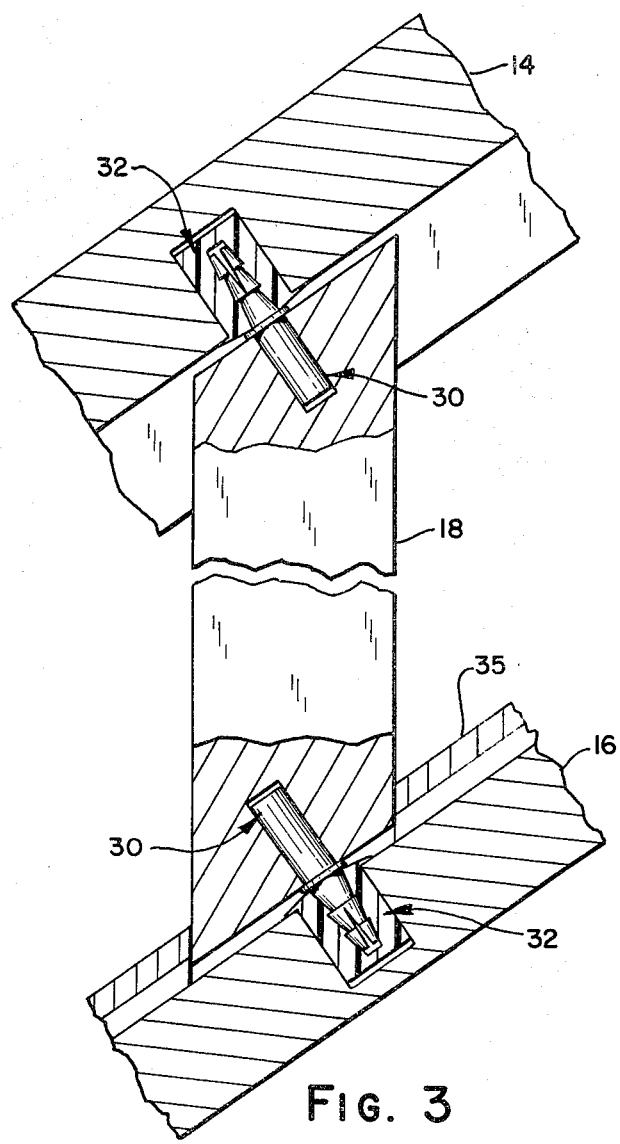
FIG. 3 is a broken away sectional view taken along the line 3—3 of FIG. 2.
Figure 4:
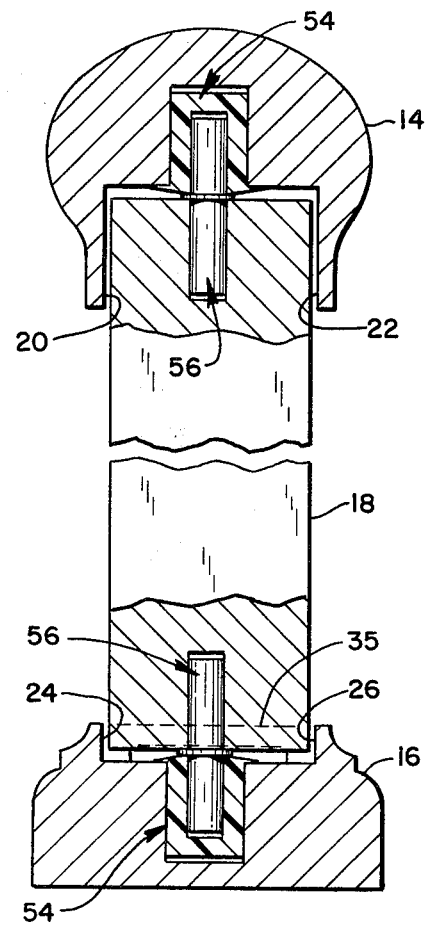
FIG. 4 is a broken away sectional view similar to that of FIG. 2 showing an embodiment of the apparatus in accordance with the invention.

Referring now to FIGS. 1-3 there is shown a variable rack stair rail assembly 10 which includes a starting newel 12, a hand rail 14, and a shoe rail 16. A plurality of balusters 18 are disposed in generally parallel relationship and extend intermediate the shoe rail 16 and the hand rail 14. The hand rail 14 includes generally parallel generally planar opposed sides 20, 22, which define a channel. The sides 20, 22 engage the sides of the upper axial extremity of each baluster 18. In a similar manner generally planar, generally parallel opposed sides 24, 26 of the shoe rail 16 engage the sides of the lower axial extremity of each baluster 18.

It will be understood that the term "variable rack rail assembly" refers to an assembly which permit relative angular movement between each baluster 18 and the cooperating rails to provide flexibility during installation. This flexibility is necessary because the relative sizes of the riser and step portions of the stairway in different buildings and even in the same building may vary and thus require the adjustment of the stair rail assembly or more particularly a variable rack stair rail assembly.

Each baluster 18 is secured to the shoe rail 16 by means of cooperating plug and socket members which are respectively identified by the numerals 30, 32 and which are illustrated in greater detail in FIGS. 5-8. Disposed at axially spaced points along each rail 14, 16 is a socket member 32 which has a generally cylindrical circumference. The lower axial extremity 33 (as viewed in FIG. 6) is preferably a section of a cone and extends furthest downward (as viewed) proximate to a central opening or bore 34 which comprises a plurality of sections or surfaces which are sections of cones. These axial sections are identified by the numerals 36, 38 and 40. The inside diameter of the bore 34 varies axially in each of the sections 36, 38 and 40 and in each of the sections the inside diameter is greatest at the axial extremity nearest to the end face 33. The end face 33 ordinarily extends radially to define a flange 42 which limits the depth of insertion of the socket member 32 into the rail 14, 16 with which it cooperates. The minimum inside diameter of any cross section in, respectively, sections 36, 38 or 40 is greater in section 40 than in 38 and similarly is greater in section 38 than in section 36 as will be apparent from FIG. 6.

The plug member 30 ordinarily will include a generally cylindrical axial section 42 which abuts a flange 44. The flange 44 will ordinarily limit the maximum axial travel of the plug member 30 into a baluster 18. Axially adjacent to the flange 44 are three axially adjacent sections 46, 48, and 50. Section 46 has the contour of a truncated cone. Sections 48 and 50 have a portion of the exterior contour shaped like a section of a cone and in addition have an axially extending bifurcation. Both the socket member 32 and the plug member 30 are preferably manufactured of a plastic such as polyvinyl chloride (PVC). The socket member 30 will preferably be manufactured with the bifurcation illustrated in FIG. 8 so that when the plug member 30 is inserted in the socket member 32 the outward bias inherent in the bifurcation will insure a locking engagement therebetween.

Figure 7:
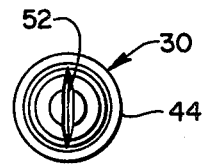
FIGS. 7 and 8 are respectively end and elevational views of an elongated member used in the embodiment of FIG. 2.
Figure 5:
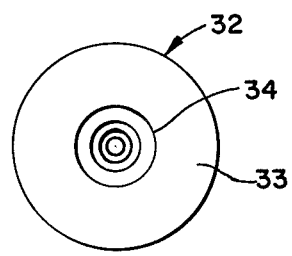
FIGS. 5 and 6 are respectively end and sectional views taken through a vertical plane of a sleeve shaped member utilized in the embodiment of FIG. 2.
Figure 8:
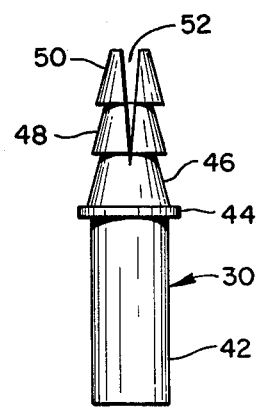
Figure 6:
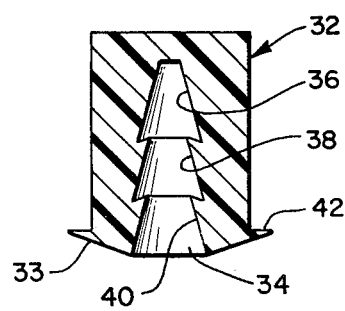

It will be seen from FIG. 8 that the maximum outside diameter of each of the sections 46, 48 and 50 occurs at the axial portion thereof which is most remote from the upper end (as illustrated in FIG. 8). Similarly the maximum outside diameter of the section 48 will be understood to be less than the maximum outside diameter of section 46. Ordinarily at least when the section 50 is compressed, the maximum outside diameter of the section 50 will be less than the maximum outside diameter of the section 48. The contours of the opening 52 defined by the bifurcations in sections 48 and 50 is best illustrated in FIG. 7.

Figures 9, 10:
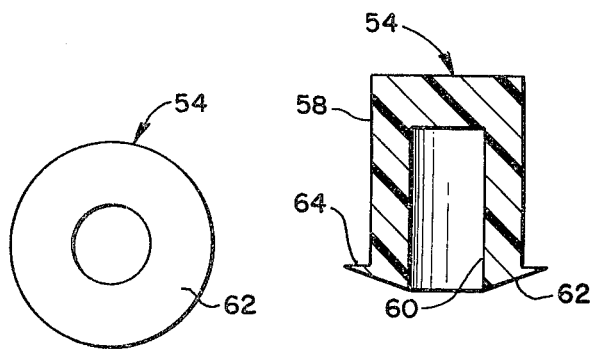
FIGS. 9 and 10 are respectively end and cross sectional views taken through a vertical plane of the sleeve shaped member utilized in the embodiment of FIG. 4.
Figures 11, 12:
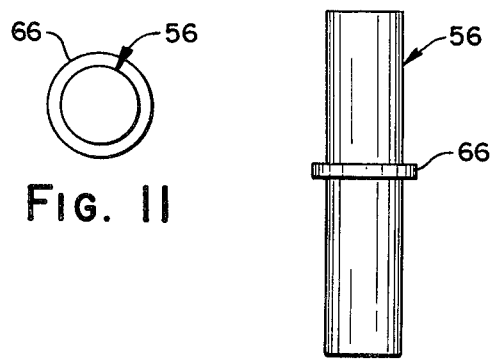
FIGS. 11 and 12 are respectively end and elevational views of the elongated member utilized in the embodiment of FIG. 4.

In another embodiment of the invention illustrated in FIG. 4 and FIGS. 9-12 a socket member 54 cooperates with a plug member 56. The socket member 54 is provided with a generally cylindrical exterior surface 58 and has a generally cylindrical bore or opening 60 therein. The lower (as illustrated in FIG. 10) axial extremity of the socket member 54 has an end face 62 which is a section of a cone and which extends radially to define a flange 64 which ordinarily limits the axial travel of the socket member 54 into a rail 14, 16 with which it cooperates.

The plug member 56 is, in this embodiment of the invention, generally cylindrical and has a radially extending flange 66 which limits the maximum depth of insertion of the plug member 56 into the socket member 54 as well as the maximum depth of insertion of the plug member 56 into the baluster 18 with which it cooperates.

Ordinarily the embodiments illustrated in FIG. 2 and FIGS. 5-8 will snap together without the necessity for any adhesive or other bonding technique. The embodiment illustrated in FIG. 4 and FIGS. 9-12 ordinarily will be assembled after positioning a solvent, such as that typically used in assembling PVC water pipes, in the socket member 54. Other adhesive or bonding techniques may be advantageously used in various embodiments of the invention.

It will be understood that the end faces 62 and 33 advantageously allow tipping of the socket member 56 or 30 with respect to the axis of the socket member 54 or 32. Some additional relative motion is also possible due to slight dimensional clearances in the parts. The plug and socket members ordinarily will be secured respectively in the balusters and rails by means of a hot melt glue which applied with a glue gun.

Ordinarily the balusters 18 and rails 14, 16, in accordance with the invention, will be fabricated at a manufacturing site and the socket and plug members will be assembled at the job site. The embodiment illustrated in FIG. 2 is particularly advantageous since the structure will snap together without the necessity for any separate application of solvent or adhesive.

In various embodiments of the invention a fillet 35 may extend along the upper surface of stair rail 16 intermediate successive balusters 18. The fillet 35, in those embodiments which utilize this element, serves to create a more satisfactory aesthetic appearance of the finished assembly.

The invention has been described with reference to its illustrated preferred embodiment. Persons skilled in the art of constructing stair rail rack assemblies may, upon exposure to the teachings herein, conceive variations in the mechanical development of the components therein. Such variations are deemed to be encompassed by the disclosure, the invention being delimited only by the appended claims.

The inventor claims:

1. A variable rack stair rail assembly which comprises:
   a hand rail,
   a shoe rail,
   a plurality of elongated balusters extending intermediate the shoe rail and the hand rail,
   means for joining each of said balusters to said hand rail and said shoe rail, said means for joining comprising an elongated plug member and a socket member having an opening thereon, said plug and socket members having respective first axial extremities dimensioned and configured for mutual engagement, one of said members being disposed in cooperating relationship with one of said rails and the other of said members being disposed in cooperating relationship with one axial extremity of the balusters, and
   said socket member having one axial extremity to which said opening extends, said first axial extremity including an outwardly extending flange.

2. The apparatus as described in claim 1, wherein:
   said socket member axial extremity is tapered with its axial extent greater proximate to its geometric center than proximate to its periphery.

3. The apparatus as described in claim 1 or 2, wherein:
   each of said plug members has a plurality of axially extending steps in adjacent relationship,
   each of said steps has at least a portion which is frustro conical, and
   each step is tapered so that the smallest radial dimension thereof is nearest to the first axial extremity of said plug member.

4. The apparatus as described in claim 1, wherein:
   the socket member is generally cylindrically shaped, and
   said plug member has at least one axially extending section for cooperation with said socket member.

5. The apparatus as described in claim 1, wherein:
   said opening in said socket member is generally cylindrically shaped.

6. The apparatus as described in claim 1, wherein:
   said plug member further includes a flange extending generally radially and said flange defines a first axial section thereof which cooperates with said socket member and a second axial section thereof which cooperates with one of said balusters.

7. The apparatus as described in claim 1, wherein:
   said plug and socket members are manufactured of polyvinyl chloride.

8. The apparatus as described in claim 1, wherein:
   said plug and socket members are joined by a bonding material.

9. The apparatus as described in claim 8, wherein:
   said bonding material is a solvent for polyvinyl chloride.

10. The apparatus as described in claim 1, 2 or 3, wherein:
    at least one of said hand rail and shoe rail is channel shaped.

11. The apparatus as described in claim 1, 2 or 3, wherein:
    said hand rail and shoe rail define confronting channels, and
    said balusters extend between said channel in said shoe rail and said channel in said hand rail.

* * * * *